United States Patent [19]

Ichikawa et al.

[11] Patent Number: 4,541,441
[45] Date of Patent: Sep. 17, 1985

[54] COMBINE HARVESTER

[75] Inventors: Tomohiko Ichikawa, Omiya; Takao Sugiyama, Hasuda; Masao Manaka, Konosu, all of Japan

[73] Assignee: Institute of Agricultural Machinery, Omiya, Japan

[21] Appl. No.: 541,222

[22] Filed: Oct. 12, 1983

[51] Int. Cl.[4] .............................................. A01F 12/18
[52] U.S. Cl. ................................. 130/27 T; 130/27 H
[58] Field of Search ................. 130/27 T, 27 Q, 27 P, 130/27 H; 56/14.6

[56] References Cited

U.S. PATENT DOCUMENTS

| 323,726 | 8/1885 | Payne | 130/27 Q |
|---|---|---|---|
| 741,974 | 10/1903 | Millard | 130/27 P |
| 1,251,187 | 12/1917 | Davis | 130/27 T |
| 1,781,472 | 11/1930 | Nagle | 130/27 T |
| 2,129,452 | 9/1938 | Van Sickle | 130/27 Q |
| 3,169,357 | 1/1965 | Suzue | 130/27 P |
| 3,589,111 | 6/1971 | Gullickson et al. | 56/14.6 |
| 3,776,242 | 12/1973 | Khan | 130/27 T |
| 3,807,413 | 4/1974 | Jacobs | 130/27 T |
| 3,940,911 | 3/1976 | Schmitt | 56/14.6 |
| 4,148,323 | 4/1979 | McMillan et al. | 130/27 T |
| 4,175,568 | 11/1979 | Nooyen | 130/27 T |
| 4,178,942 | 12/1979 | Nusser | 130/30 H |
| 4,244,380 | 1/1981 | DePauw et al. | 130/27 T |
| 4,270,550 | 6/1981 | da Silva | 56/14.6 |

FOREIGN PATENT DOCUMENTS 1941248  5/1979  Fed. Rep. of Germany .... 130/27 T

Primary Examiner—Paul J. Hirsch
Attorney, Agent, or Firm—Martin A. Farber

[57] ABSTRACT

A combine harvester having a cutting device provided in a front portion of the combine harvester, a conveying device for conveying the cut crops, a threshing device for threshing the conveyed crops, and a separating device for separating the threshed crops. The threshing device comprises a threshing auger oriented in the traveling direction of the harvester, and a concave sieve provided around a lower portion of the auger. The separating device comprises two separating augers arranged parallel with the threshing auger at a position under the concave sieve, and a sieve provided under the separating auger.

8 Claims, 7 Drawing Figures

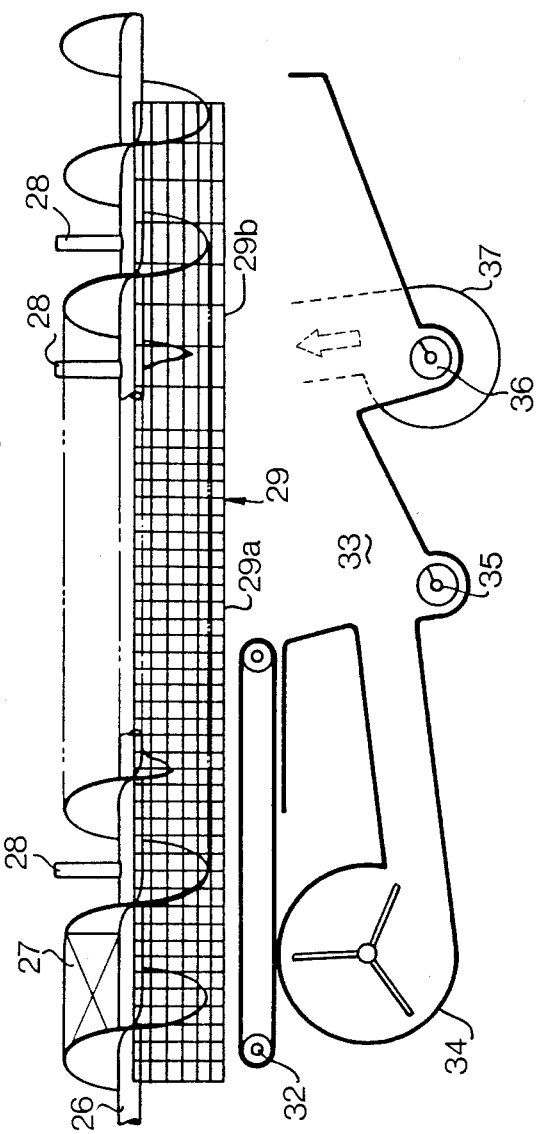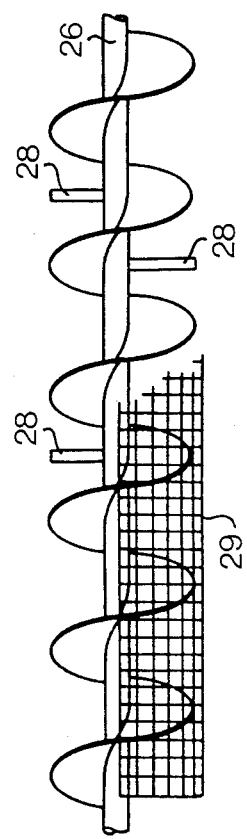

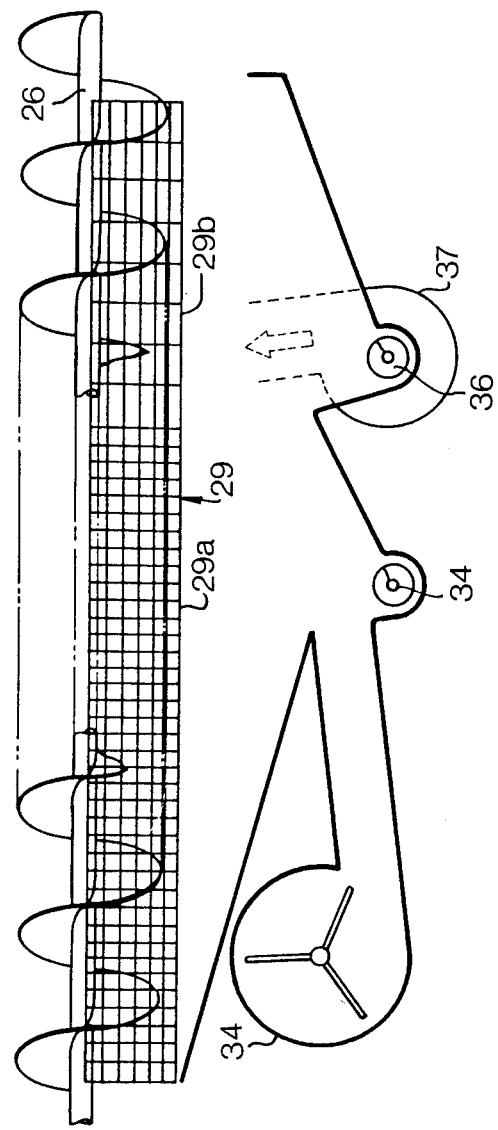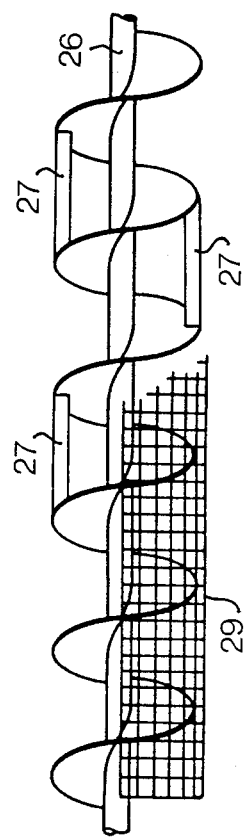

COMBINE HARVESTER

BACKGROUND OF THE INVENTION

The present invention relates to a combine harvester which can be applied to harvesting operations for various crops such as paddy, wheat and barley, soybeans, buckwheat, and rapeseed.

SUMMARY OF THE INVENTION

An object of the present invention is to provide a combine harvester having a screw-type threshing and separating device which can be used for harvesting a wide diversity of crops, and which can be simplified in mechanism, and has eminent workability, operability and durability.

BRIEF DESCRIPTION OF DRAWINGS

FIG. 4 is an enlarged view of a part of FIG. 1;

FIG. 5 is a side sectional view of another example of the separating portion;

FIG. 6 is a side sectional view of another example of the separating portion, and FIG. 7 is a side sectional view of another example of the separating portion.

DESCRIPTION OF THE PREFERRED EMBODIMENTS

Figure 1:
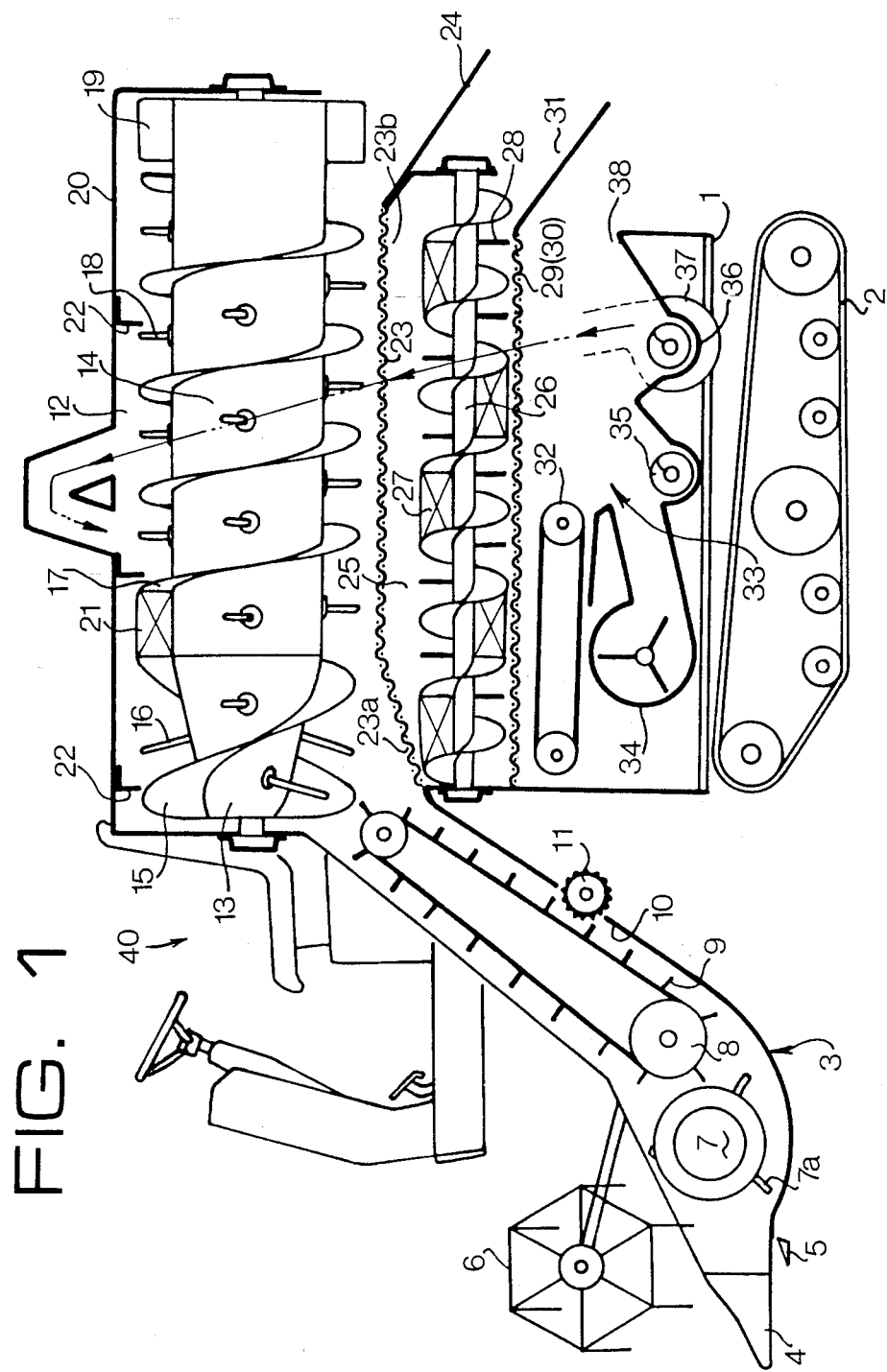
FIG. 1 is a sectional side view of a combine harvester according to the present invention.

Referring to FIG. 1, numeral 1 designates a chassis which is equipped with a crawler-type travelling device 2. In front of the chassis 1 is a conveying device 3 for reaping crops grown on fields and conveying thereof. The reaping and conveying device 3 comprises a pair of dividers 4, a cutting bar 5, a pickup reel 6, a gathering auger 7 which includes radially projecting crank fingers 7a, a chain-type conveyor 8 having a plurality of carriers 9 arranged on the chain, a base 10 facing the carriers, and a chopping device 11 provided on the base. The entire device can be vertically moved so as to adjust the height from the ground.

The travel end of the conveyer 8 is adjacent to a lower portion of an inlet of a threshing chamber 12, the longitudinal axis of which is arranged along the travelling direction of the combine harvester. Inside the threshing chamber 12, a threshing auger comprising a conical introduction auger comprising a drum 13 and a cylindrical threshing auger comprising a drum 14 is rotatably supported at both ends. Provided on the periphery of the drum 13 are helical introducing vanes 15 and radial threshing teeth 16, and provided on the periphery of the drum 14 are helical threshing vanes 17 and radial threshing teeth 18. Furthermore, discharging plates 19 are disposed on a rear periphery of the drum 14. The discharge portion of the introducing vane 15 and the intake portion of the threshing vane 17 are connected with each other by an agitator 21.

The threshing chamber is covered by a threshing chamber covering 20, the inner side of which is provided with a plurality of baffle plates 22 at predetermined spacing.

Figure 2:
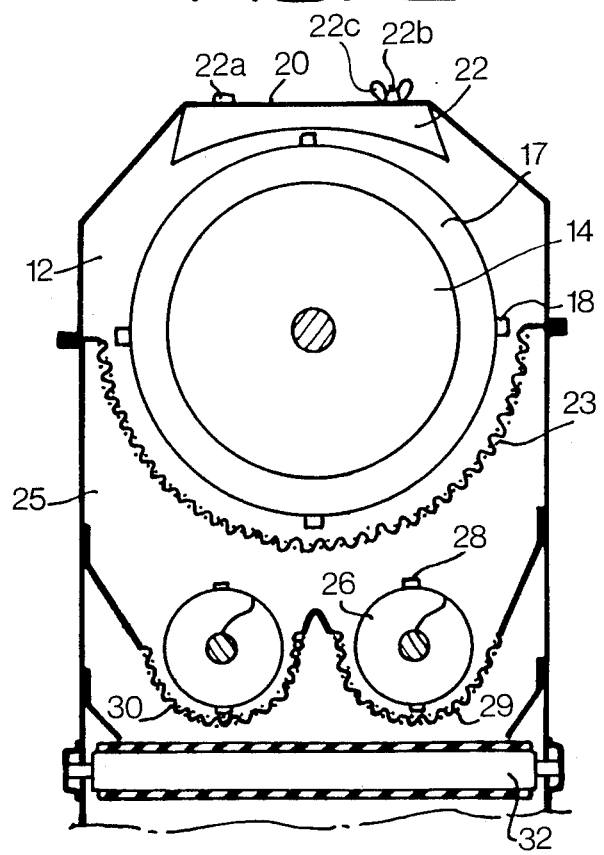
FIG. 2 is a sectional view of the threshing and the separating portions of the combine harvester.
Figure 3:
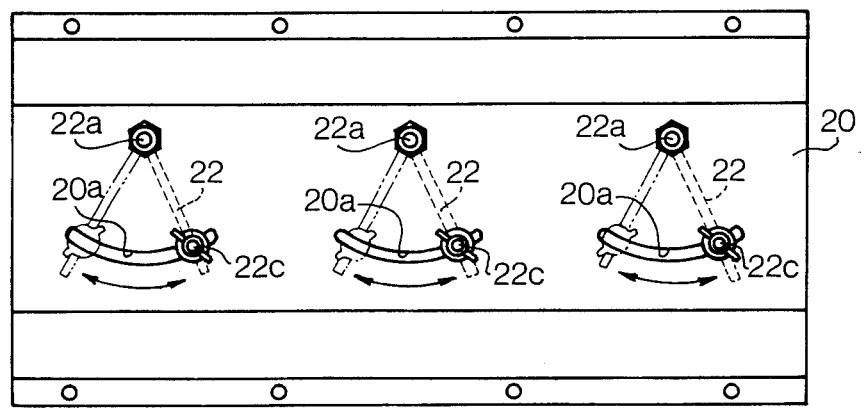
FIG. 3 is a top plan view of the threshing chamber covering.

As shown in FIGS. 2 and 3, each baffle plate 22 is rotatably supported at one end thereof by a supporting pin 22a and at the other end by an adjusting bolt 22b with a butterfly nut 22c. An adjusting bolt 22b is inserted into an arc-shaped slit 20a formed in the upper covering 20 and can be shifted along the slit and secured by the butterfly nut 22c at an appropriate position in the range of length of the slit, so that the angle between the baffle plates 22 and the axial line of the drum 14 can be adjusted.

A concave sieve 23 comprising an introducing sieve portion 23a and a threshing sieve portion 23b is provided along lower peripheries of the drums 13, 14 in a lower part of the threshing chamber 12. At the rear end of the concave sieve 23, a straw outlet 24 opposing the discharging plates 19 is formed. The size of each mesh of the sieve 23b of threshing portion becomes progressively larger towards the rear of the sieve. Provided under the concave sieve is a separating chamber 25, wherein two augers 26 are rotatably secured and oriented in the direction parallel to the longitudinal axis of the threshing chamber 12 and the drum 14. A plurality of agitators 27 and a plurality of agitating rods 28 are disposed between the screwthread of augers 26. The receiving section under the augers 26 is provided with separating sieve 29 and 30, the meshes of which are smaller at the front portion and larger at the rear portion as shown in FIG. 5. A straw outlet 31 is formed at the end of separating sieves 29 and 30.

Under the front half portion of the separating sieves 29 and 30 a transfer device 32 is provided comprising a belt conveyor, conveying end of which is located in an inlet of a winnowing chamber 33. Air blast generated by a grain fan 34 enters the winnowing chamber 33, grain auger 35 and tailings auger 36 are disposed in lower portions of the winnowing chamber and the tailings auger is connected to the upper portion of the threshing chamber 12 through bucket conveyor, a 37 for rethreshing of the stalks. A rear end of the tailings auger 36 is opened to form a dust discharging outlet 38. Numeral 40 designates a driver's position.

Operation of the embodiment of the present invention will be described hereinafter, in harvesting of paddy as an example.

Paddy stalks which are divided by dividers 4 and then lifted up by pickup reel 6 are cut at roots of seedlings. The cut stalks are gathered by gathering auger 7 and passed rearward by crank fingers 7a. The stalks of paddy are conveyed by the carrier 9 along the base 10 towards the threshing chamber 12, the longer stalks are chopped up by the chopping device 11.

The use of chopping device 11 prevents the straw from wrapping on the drums 13 and 14, consequently stabilizing conveying operations, and also decreasing required power. Therefore, it is preferable to apply the chopping device when threshing long stalked crops or high moist crops or when operating a large flow volume (at a high speed). The chopping device 11 may comprise a single or plural blades.

The paddy stalks when passed into the threshing chamber 12, are introduced by the introducing vane 15 and subsequently conveyed with the rotation of the drum in the axial direction thereof, then threshed by radial teeth 16. With the action of the agitators 21, the paddy stalks progress further towards the helical threshing tooth 17 whereby the paddy is threshed forcefully by the friction between the drum and the concave sieve 23, while being swept in the axial direction. Whereas the baffle plates 22 control the travelling rate of the paddy stalks, radial teeth 18 encourage the threshing and agitating operations.

When threshing crops including much moisture or crops having difficulty in threshing such as paddy, the baffle plates 22 are adjusted to a position by the adjusting bolts 22b, and butterfly nuts 22c so as to throttle the passage in the auger. Thus, a high threshing rate can be obtained. To the contrary, when threshing dry crops or crops easy in threshing such as soy beans, buckwheat, and wheat, baffle plates 22 are adjusted so that the resistance of the travelling stalks may be lowered. In this manner, the baffle plates 22 can be controlled in dependency on conditions of the crops in operation. Most of grains including paddy with rachis branches and unthreaded head which are threshed in the threshing chamber 12, drop through the concave sieve 23 together with short fragments of straw to the separating chamber 25. Long straws remaining in the threshing chamber 12 are transferred rearward in the axial direction thereof, and are discharged from the body by the discharging plates 19 through the straw outlet 24. When employing a large meshed sieve for the rear part of the threshing portion concave sieve 23b, long straws will drop through the sieve, thereby reducing the discharging loss.

The grains and straws which have fallen to the separating chamber 25 are conveyed in the axial direction by the auger 26. While grains and fine straws fall through a front half portion of the separating sieves 29, 30 and drop on the transfer device 32, longer straws, rachis branches, unthreaded grains are still conveyed in the axial direction, and with some straw fall through a large meshed rear half portion of the separating sieves 29 and 30. Longer straws which fail to go through the sieve are discharged from the body through the straw outlet 31.

In the embodiment shown in FIG. 1, a plurality of agitators 27 and agitating rods 28 are arranged on the periphery of augers 26. These are provided so as to prevent the sieves from getting clogged and to promote the helical movements of the separating objects as well as to heighten the separating and processing capacity. But as shown in FIGS. 5 to 7 either or both of the agitators and agitating rods may be removed in dependency on the separating degree and the nature of the crops to be graded. Alternatively, the setting positions and the numbers of the agitators and rods and the manner of their combination can be modified. Grains and short straws which fall on the transfer device 32 are exposed to an air blast from the separating fan 34 for separation while dropping to the winnowing chamber 33. Finely sorted grains will fall on the grain auger 35 and then are recovered through a recovery device (not shown), while the fragments of straw are discharged out of the body through the dust discharging outlet 38. Rachis, branches and unthreshed grains passing through the rear half of the separating sieves 29, 30 will fall on the trailings auger 36 and will be brought back to the threshing chamber 12 through the tailings bucket conveyer 37 for rethreshing.

While the presently preferred embodiments of the present invention have been shown and described, it is to be understood that this disclosure is for the purpose of illustration and that various charges and modifications may be made without departing from the spirit and scope of the invention as set forth in the appended claims.

What is claimed is:

1. In a combine harvester of the type having a cutting device provided in a front portion of the combine harvester, a conveying device for conveying the cut crops, a threshing auger for threshing the conveyed crops, and a separating device for separating the threshed crops, the improvement comprising:
    said threshing auger comprising a cylindrical drum oriented in the travelling direction of the combine harvester, and a helical threshing vane on the drum;
    a concave sieve adjacent a lower portion of said auger;
    a cover above the auger;
    said separating device comprising at least one separating auger arranged parallel with said threshing auger at a position under said concave sieve, and at least one sieve under the separating auger;
    a transfer means under said separating device for transferring sorted crops;
    a plurality of radial threshing teeth on said drum;
    at least one agitator between adjacent portions of said vane; and
    a plurality of radial agitating rods on said separating auger.

2. The combine harvester according to claim 1 further comprising a winnowing device provided adjacent to a travelling end of said transfer means.

3. The combine harvester according to claim 1 further comprising
    at least one baffle plate provided on an inside wall of said cover to control of the flow of said crops.

4. The combine harvester according to claim 1 further comprising
    a conveyor provided in said separating device for returning sorted crops to said threshing auger.

5. The combine harvester according to claim 4 wherein
    the size of mesh of said at least one sieve of said separating device is smaller at a forward portion corresponding to said conveyor compared to a rearward portion of the at least one sieve.

6. The combine harvester according to claim 3 wherein
    the baffle plate is mounted such that the angle between the baffle plate and the longitudinal axis of the drum is adjustable.

7. The combine harvester according to claim 1, wherein
    said threshing auger includes a conical introduction auger secured to said cylindrical drum adjacent an end of the conveying device, a helical introduction vane on said conical introduction drum, and
    a plurality of threshing teeth substantially perpendicularly mounted on said conical introduction drum.

8. The combine harvester according to claim 7, wherein
    said conical introduction drum is positioned above a substantial portion of said transfer means.

* * * * *

UNITED STATES PATENT AND TRADEMARK OFFICE
CERTIFICATE OF CORRECTION

PATENT NO. : 4,541,441
DATED : September 17, 1985
INVENTOR(S) : Tomohiko Ichikawa, et al It is certified that error appears in the above-identified patent and that said Letters Patent is hereby corrected as shown below:

(Claim 5) Column 4, line 43 change "smaller" to --larger-- and delete "forward" lines 43-44 change "corresponding" to --adjacent-- line 44 change "compared to a rearward" to --than at a forward--

Signed and Sealed this

Twenty-ninth Day of April 1986

[SEAL]

Attest:

DONALD J. QUIGG

Attesting Officer

Commissioner of Patents and Trademarks